Re. 24402
July 19, 1955     G. A. LYON     2,713,512
WHEEL COVER
Filed Oct. 1, 1952     2 Sheets-Sheet 1
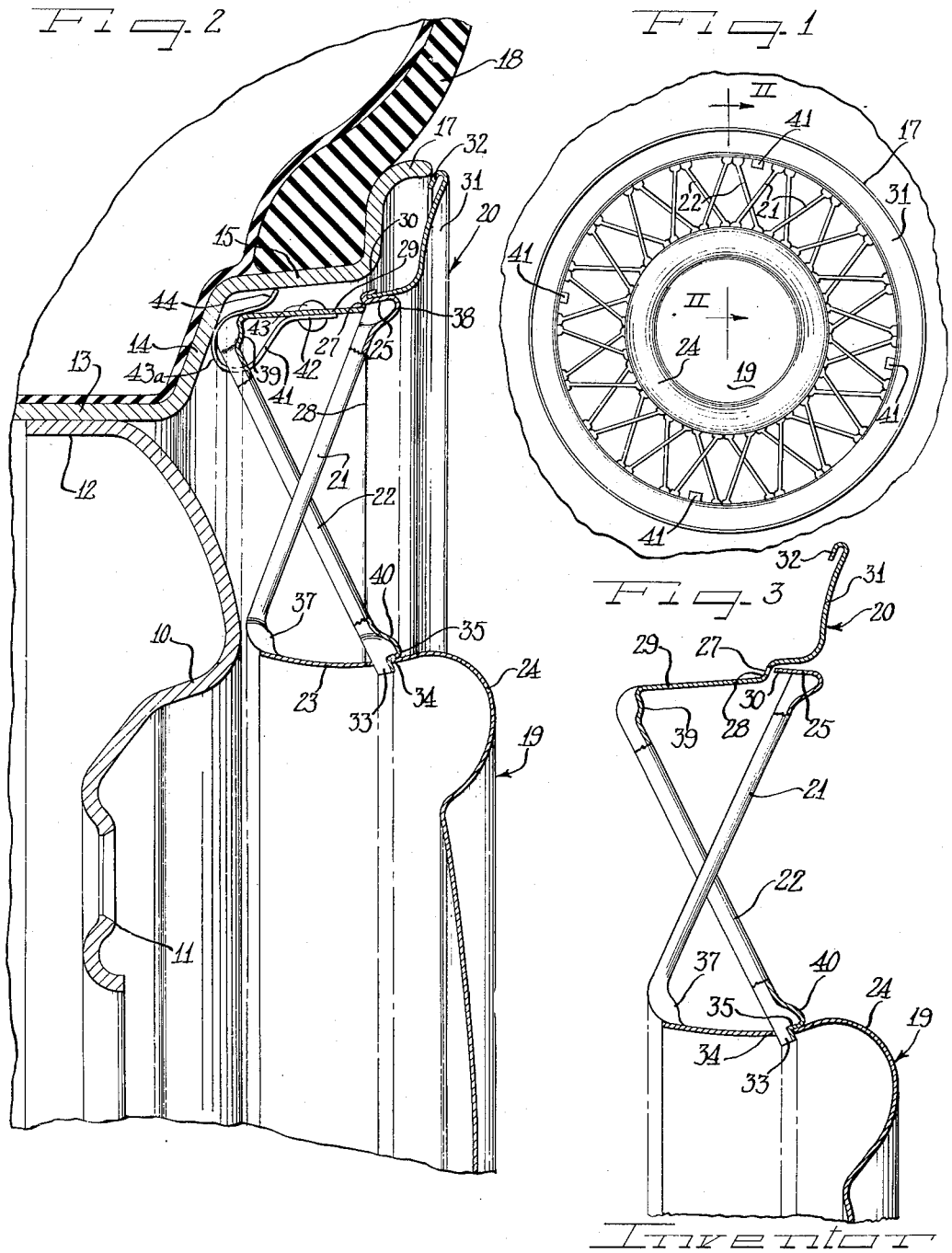
Inventor
George Albert Lyon July 19, 1955   G. A. LYON   2,713,512
WHEEL COVER
Filed Oct. 1, 1952   2 Sheets-Sheet 2
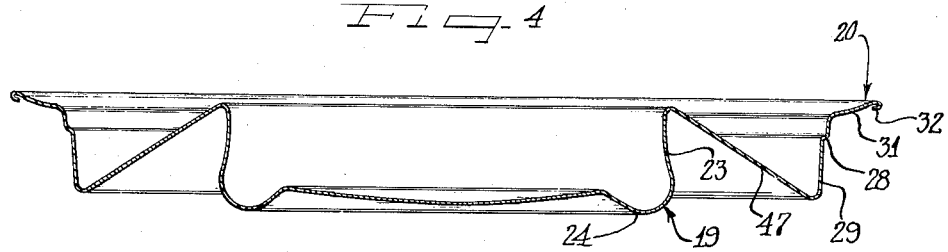
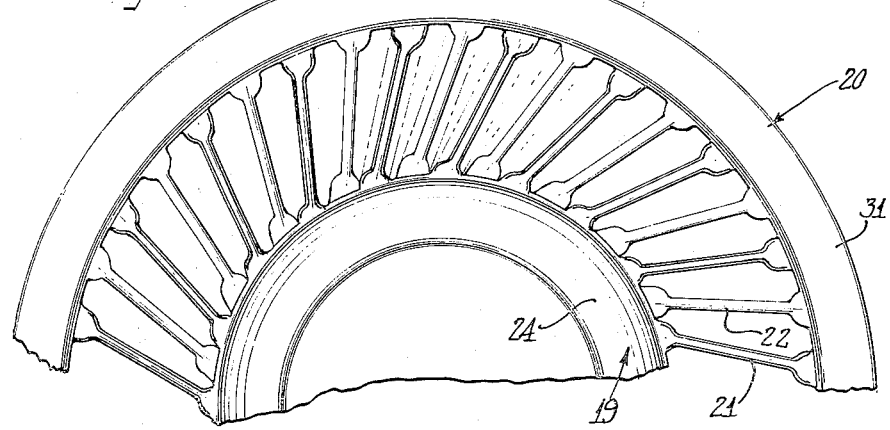
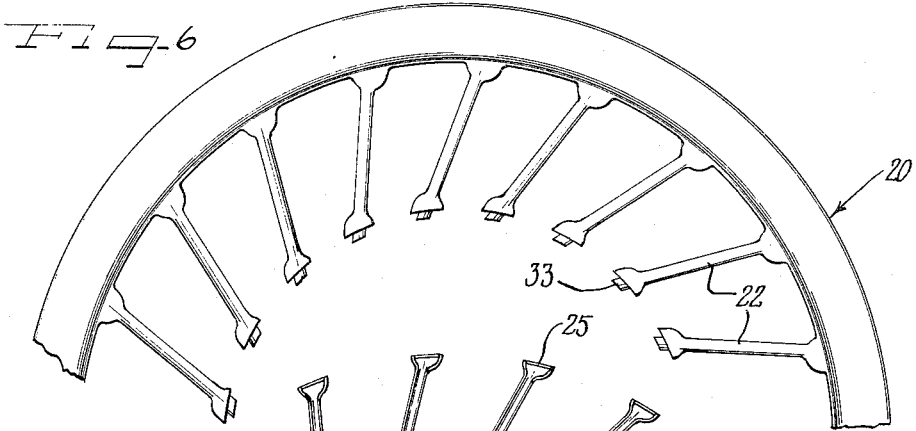
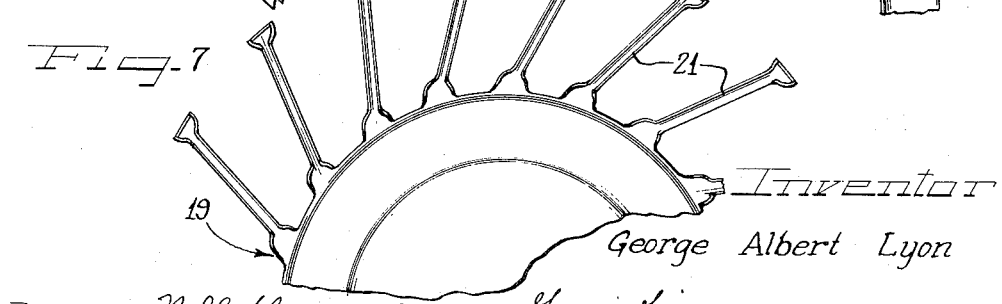
Inventor
George Albert Lyon

United States Patent Office 2,713,512
Patented July 19, 1955

2,713,512

WHEEL COVER

George Albert Lyon, Detroit, Mich.

Application October 1, 1952, Serial No. 312,518

7 Claims. (Cl. 301—37)

The present invention relates to improvements in wheel structure and method of making the same and more particularly concerns the ornamental and protective covering of the outer side of vehicle wheels.

An object of the present invention is to provide a vehicle wheel of the conventional disk spider type having novel means thereon to afford the illusion that the wheel is of the wire spoke type.

Another object of the invention is to provide an improved wheel cover having novel means simulating a wire spoke wheel structure.

A further object of the invention is to provide a novel wheel cover strongly simulative of wire wheel spoke structure.

Still another object of the invention is to provide a novel method of making a cover of simulated spoke wheel appearance.

Yet another object of the invention is to provide a novel method of making a cover of simulated spoke wheel appearance from a single sheet metal blank to provide crossing spoke members in the finished article.

Other objects, features and advantages of the present invention will be readily apparent from the following detailed description of a preferred embodiment thereof taken in conjunction with the accompanying drawings in which:

Figure 1 is a side elevational view of a vehicle wheel structure embodying the features of the present invention;

Figure 2 is a fragmentary enlarged radial sectional view taken substantially on the line II—II of Figure 1;

Figure 3 is a sectional view through the cover, similar to Figure 2 but showing a step in the method of making the cover;

Figure 4 is a diametrical sectional view through a drawn sheet metal blank demonstrating an early phase in the method of making the cover;

Figure 5 is a fragmentary elevational view of the blank shown in Figure 4;

Figure 6 is a fragmentary elevational view of the trim ring portion of the blank of Figures 4 and 5 after separation from the crown portion of the blank; and Figure 7 is an elevational view of the crown portion of the blank after separation of the two portions of the blank.

The invention is adapted to be incorporated with a wheel comprising a wheel body 10 of the conventional disk spider type having a wheel body 10 and a bolt-on flange 11 centrally dished therein. A peripheral outer marginal generally axially inwardly extending flange 12 on the wheel body is adapted for attachment to a base flange 13 of a tire rim which also has a side flange 14 extending generally radially outwardly, an intermediate flange 15 extending generally axially outwardly, and a terminal flange 17 of the type known as a multi-flanged drop center rim adapted for supporting a pneumatic tire and tube assembly 18.

For disposition at the outer side of the wheel I have provided a novel wheel cover comprising a central crown portion 19 and a trim ring portion 20 which are connected together by means of spokes 21 and 22. The construction and arrangement of the cover is such that when in place on the outer side of the wheel the appearance of the wheel is as though it were a wire spoke type of wheel.

A great advantage is gained, however, by the fact that the disk spider type of wheel is far less costly to manufacture than a spoke type wheel, and a cover as depicted here, which can be made at reasonably moderate cost from sheet metal, added to the disk spider wheel adds only a fraction of the cost differential between a disk spider wheel and a wire spoke wheel. More especially, the wheel cover lends itself more readily to finishing as desired, as for example by plating and polishing to a high luster.

At its outer periphery the crown member 19 has a generally axially inwardly extending flange 23 joined thereto on a round annular outwardly projecting rib-like prominence 24. The spokes 21 extend integrally in one piece from the inner margin of the flange 23 and project generally radially and axially outwardly and are angled uniformly in one rotary or torsional direction from the true radius. As seen in Figure 1 the spokes 21 are angled clockwise. Each of the spokes 21 is formed as a more or less tubular cross-sectionally rounded rib-like elongated element having a distal end flange 25 directed generally axially inwardly and extending through a slot 27 in a shoulder 28 of a generally axially inwardly extending flange 29 on the trim ring member 20 which in assembly opposes the flange 23 of the crown member in spaced relation with the spokes connecting the two members together in the gap thus provided between the axially extending flanges. A terminal flange 30 is bent over upon itself to secure the spoke 21 in place.

The trim ring member 20 comprises a body 31 extending generally radially and preferably overlying the terminal flange 17 of the tire rim and having its outer margin turned under into a reinforcing and finishing flange bead 32. Each of the spokes 22 extends integrally in one piece from the inner margin of the axially extending flange 29 of the trim member 20. The spokes 22 extend generally radially inwardly and axially outwardly and are angled from a true radius in a torsional direction opposite to the spokes 21, that is counterclockwise as viewed in Figure 1. There are an equal number of spokes 21 and 22 and in the assembly the spokes cross one another as depicted. Each of the spokes 22 has at its distal end a rounded lug 33 serving as an attachment terminal which in assembly fits within a respective round aperture 34 provided in the flange 23. A shoulder 35 is provided inset from the tip of the terminal 33 for limit abutment against the outside of the flange 23 in assembly.

In order further to effect the illusion of a spoke wheel, each of the spokes 21 and 22 is provided with end boss-like enlargements simulative of the attachment bosses of a spoke wheel. To this end, the spokes 21 have respective enlargement end portions 37 at their bases and enlargements 38 at their distal end portions adjacent the attachment flanges 25 thereof. The spokes 22 have base enlargements 39 and distal end enlargements 40 adjacent to the shoulders 35 thereof.

It will be observed that the trim ring portion 20 of the cover is of generally L-shape with one of the legs comprising the body 31 overlying the terminal flange of the tire rim and the remaining leg comprising the flange 29 arranged to extend inwardly in inwardly spaced relation to the intermediate flange 15 of the tire rim.

For attachment of the cover to the wheel, the flange 29 of the trim ring portion of the cover may be provided with a series of retaining clip members 41 which, as shown, have respective attachment leg portions 42 which are secured as by means of respective rivets 43 to the radially inner side of the flange 29, while attachment spring loops 43a of the clips extend generally axially and radially inwardly and then curve generally radially outwardly and then axially outwardly about the inner edge of the flange 29 so that the retaining terminals 44 of the clips will engage in resilient, tensioned biting retaining engagement with the intermediate flange 15. In the fully assembled relationship of the clips, the inner margin of the flange 29 preferably engages against the terminal leg portion of the clip loops to increase the retaining tension of the clips against the intermediate flange. Through this arrangement, the cover can be applied easily to the wheel by generally centering the cover relative to the wheel and pushing inwardly thereon. The clips are of such construction and function in such a manner as to center the cover. To remove the cover a pry-off tool may be engaged under the outer edge flange 32 of the trim ring member and pry-off force levered thereagainst by forcing the pry-off tool against the rim flange 17. In this connection the shoulder 28 of the trim ring affords a convenient secondary pry-off shoulder spaced inwardly from the pry-off shoulder provided by the flange 32.

According to the present invention, the cover is adapted to be made from a single sheet metal blank such as stainless steel or brass of suitable thin gauge for fairly deep drawing by means of suitable press equipment. After preliminary drawing, the sheet metal blank appears substantially as seen in Figure 4 wherein the crown portion 19 and the trim ring portion 20 are integrally joined in one piece by a generally oblique and preferably frusto-conically disposed intermediate annular area 47. Moreover, the crown portion and trim ring portion are drawn in respectively reverse order to the final assembled relationship thereof in the cover. That is, the trim ring faces in the direction of the back of the crown portion and likewise the crown portion faces in the direction of the back of the trim ring portion. As thus constructed, the drawn cover blank can be readily plated and polished.

Following the polishing, the intermediate portion 22 of the blank is trimmed out at uniform intervals as depicted in dash outline in Figure 5 to separate the same into spoke sections connecting the two portions of the cover. The spoke sections are then formed up to the rounded cross-section with the end boss enlargements. At the same time, or after the forming up of the cover the ends of the respective pairs of spokes are severed from the companion piece and the two parts of the cover 19 and 20 are separated as depicted in Figures 6 and 7 and the distal end flange and lug are formed thereon preparatory to relative reversal and assembly of the two parts of the cover.

In effecting assembly of the cover components 19 and 20, the spokes 21 and 22 are generally disposed for final assembly and the end lugs 33 of the spokes 22 are moved under tension into the respective receiving apertures 34 therefor in the flange 23 of the crown cover component 19. Then the terminal portions 30 of the flanges 25 of the spokes 21 are inserted through the slots 27 in the shoulder 28 of the trim component 20 and the spokes 21 tensioned into abutment at the flange 25 against the opposing side of the flange 29 of the trim component. Assembly is completed by bending the terminal flange portions 30 upon themselves to clinch the ends of the spokes 21 in place.

Reference is made to my co-pending application Serial No. 323,628 filed December 2, 1952, covering novel features of the retaining spring clips disclosed but not claimed herein.

It will be understood that modifications and variations may be effected without departing from the scope of the novel concepts of the present invention.

I claim as my invention:

1. In a cover for disposition at the outer side of a vehicle wheel, inner and outer cover members having respective opposed radially spaced generally axially extending flange portions, said flange portions having respective spoke elements projecting from the respective extremities thereof and secured to the opposite flange portions substantially spaced from said extremities.

2. In a cover simulating a wire spoke wheel, an inner cover member, an outer cover member, said inner cover member having a generally axially extending flange provided with generally radially outwardly extending spokes at the inner margin of said flange, said spokes being connected to said outer cover member, said outer cover member carrying a series of spokes projecting generally radially inwardly and connected to said inner cover member spaced substantially axially from said margin.

3. In a cover for disposition at the outer side of a vehicle wheel cover inner and outer circular cover members each of which has spokes directed toward the other of said members and connected thereto, one of said cover members having a shoulder thereon slotted at intervals and the spokes of the other of said cover members having flanges engaging in said slots and interlockingly turned relative to the spokes.

4. In a cover for disposition at the outer side of a vehicle wheel, an inner cover member and an outer cover member, spokes on said outer cover member, said inner cover member having a generally axially inwardly and radially outwardly facing portion substantially concealed by an overhanging axially outer portion and provided with respective apertures therein, said spokes having end lugs retainingly engaged in said apertures.

5. In a cover for disposition at the outer side of a vehicle wheel, an inner cover member, an outer member, spoke-like elements connecting said cover members, said outer cover member having a generally axially inwardly extending flange, and spring clips secured to the radially inner side of said flange and extending generally radially and axially inwardly and then generally radially and axially outwardly around the inner margin of said flange and having a retaining terminal projecting radially outwardly from said flange for engagement with a tire rim.

6. In a cover for disposition at the outer side of a vehicle wheel, an inner cover member, an outer member, spoke-like elements connecting said cover members, said outer cover member having a generally axially inwardly extending flange, and spring clips secured to the radially inner side of said flange and extending generally radially and axially inwardly and then generally radially and axially outwardly around the inner margin of said flange and having a retaining terminal projecting radially outwardly from said flange for engagement with a tire rim, said flange margin being engageable with said clips in the assembled relationship thereof on a wheel for tensioning the clips.

7. In a cover for disposition at the outer side of a vehicle wheel, an inner cover member, an outer cover member, said inner cover member having an axially extending flange provided with a series of spoke elements projecting from its inner extremity and having a series of apertures therein spaced axially outwardly from the spoke elements, said outer cover member having an axially inwardly extending flange provided with a series of spoke elements projecting from its inner extremity and having a series of apertures therein spaced axially outwardly from such spoke elements, the spoke elements of the inner cover member having end portions assembled in the apertures in the flange of the outer cover member, and the spoke elements of the outer cover member having end portions assembled in the apertures in the flange of the inner cover member.

References Cited in the file of this patent

UNITED STATES PATENTS

| D. 166,863 | McLeod I | May 27, 1952 |
| D. 167,801 | McLeod II | Sept. 23, 1952 |
| 2,356,984 | Lyon III | Sept. 26, 1944 |
| 2,358,229 | Lyon IV | June 30, 1945 |
| 2,504,995 | Lyon I | Apr. 25, 1950 |
| 2,505,780 | Lyon II | May 2, 1950 |

FOREIGN PATENTS

| 714,587 | France | Sept. 7, 1931 |